Oct. 22, 1968   E. P. KOLLAR ET AL   3,406,477
FILM RECORD CARD AND METHOD FOR MAKING SAME
Filed Feb. 13, 1967   5 Sheets-Sheet 1

INVENTORS
STANLEY M. JENSEN
ERNEST P. KOLLAR
DARWYN L. TILEY
BY Edward S. Gershuny
AGENT Oct. 22, 1968   E. P. KOLLAR ET AL   3,406,477
FILM RECORD CARD AND METHOD FOR MAKING SAME
Filed Feb. 13, 1967   5 Sheets-Sheet 2
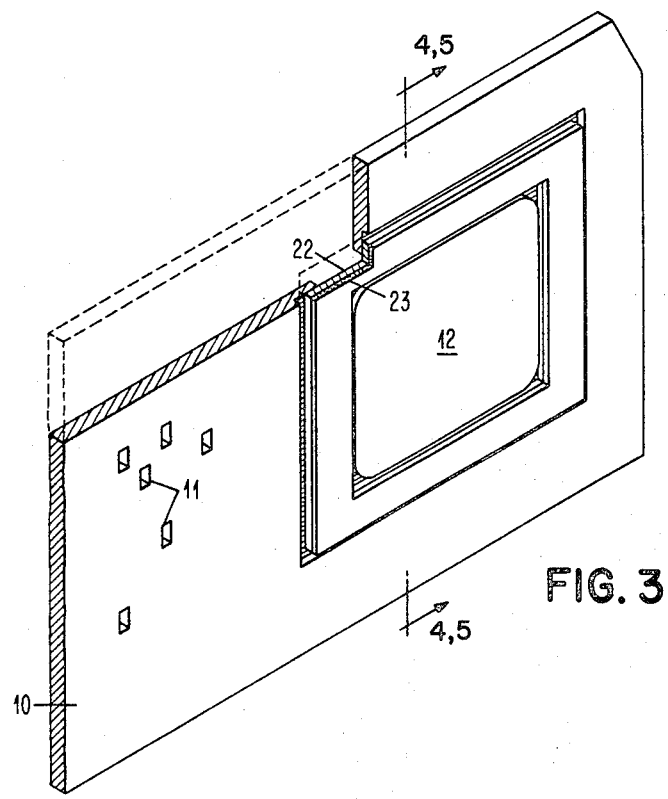
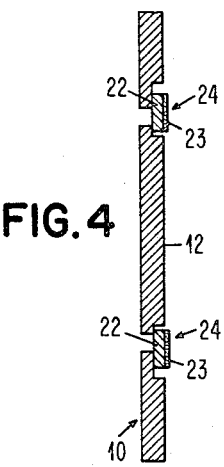
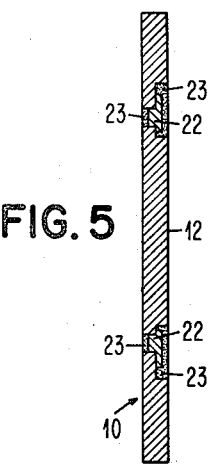

Oct. 22, 1968    E. P. KOLLAR ET AL    3,406,477
FILM RECORD CARD AND METHOD FOR MAKING SAME
Filed Feb. 13, 1967    5 Sheets-Sheet 3

Oct. 22, 1968    E. P. KOLLAR ET AL    3,406,477
FILM RECORD CARD AND METHOD FOR MAKING SAME
Filed Feb. 13, 1967    5 Sheets-Sheet 5

United States Patent Office 3,406,477
Patented Oct. 22, 1968

3,406,477
FILM RECORD CARD AND METHOD FOR
MAKING SAME
Ernest P. Kollar, Broomfield, Colo., and Stanley M. Jensen and Darwyn L. Tiley, Apalachin, N.Y., assignors to International Business Machines Corporation, Armonk, N.Y., a corporation of New York
Filed Feb. 13, 1967, Ser. No. 615,786
3 Claims. (Cl. 40—158)

ABSTRACT OF THE DISCLOSURE

A method for making a film record card, and the card made by the method. A trench is formed in one face of the card surrounding an area to be apertured. A series of slits is cut in the bottom of the trench. The trench and slits are filled by a frame made of a matte which has been coated and impregnated by a thermoplastic material. The portion of the card defined by the inner periphery of the slits is removed leaving an aperture into which the edge portions of the frame partially extend. A film insert is positioned in the aperture and bonded to the edge portions of the frame.

---

This invention relates to film record cards in which individual microfilm sections are mounted and a method of making the same. More particularly, it is an improvement upon the invention described and claimed in Patent 3,283,-432 issued Nov. 8, 1966, for "Film Record Cards and Method for Making Same," by Ernest P. Kollar et al. and assigned to International Business Machines Corporation.

It is well known to mount film sections or other transparencies for filing, projecting and other purposes by employing a card having an aperture therein to receive the film section, and adhesively securing said film section to a transparent or opaque adhesive coated sheet which is secured to one surface of the card and extends across the aperture. In the case of an opaque adhesive sheet the latter is provided with an opening smaller than the card aperture to expose a portion of the film section and permit light to be transmitted therethrough. It also has been proposed to utilize a card having an aperture therein and an embossed recess in one surface thereof surrounding said aperture, in which recess the film or adhesive sheet may be placed and secured so that the outer surface of said film or sheet is even with or slightly below the surface of the card.

The use of mounting sheets has been necessitated by the fact that no portion of the mounted film insert should project beyond the card on either side so that the card may pass through record controlled machines without the film insert getting caught and torn loose. Additional consideration must be taken of the fact that the thickness of the cards commonly used in card handling machines is only .007 inch while the thickness of the film may vary from the thickness of diazo film which is approximately .003 inch to the silver halide film thickness of .005 to .0055 inch, because allowance must be made to take care of the thickness of the adhesive substance used to secure the film. It can be seen then that for straightforward mounting of a silver halide film insert onto an adhesive coated shoulder, it becomes necessary to compress the card stock surrounding the aperture to a depth of .006 inch leaving a shoulder of .001 inch thickness. As a practical matter, it has been found that it is impossible to compress the present standard card stock, which has basis weight of 99 pounds per 3,000 square feet and a thickness of approximately .007 inch, to a depth sufficient for the insertion of film having a thickness of at least .0025 inch without deforming or pushing out the reverse side of the card. This is because the density of the compressed portion would then exceed the density of solid cellulose.

In view of this major problem relative to the compressibility of card stock, as was mentioned, use has been made of an apertured mounting sheet of pressure sensitive or heat sensitive adhesive material secured to a compressed shoulder surrounding the card aperture, which shoulder need only have a depth of approximately .0015 inch. A narrow section of the sheet extends into the aperture with exposed adhesive thereon for subsequent mounting of a transparency in the aperture which has a depth of .0055 inch. However, it was found that these prior mounts have the disadvantages that they are expensive and difficult to manufacture and require expensive machinery. Additionally, they are a prepared mount requiring the user to stock a quantity of the same for subsequent use and to be dependent upon the supplier. Also, where a pressure sensitive adhesive is used it becomes necessary to use a temporary protective cover sheet which has to be removed prior to mounting the film, thus burdening the customer with an added step to perform and additional expense. In an attempt to eliminate the need for using separate mounting sheets, proposals have been made whereby the film insert is secured wholly within the card aperture without the aid of an adhesive coated sheet or an embossed recess in the card. The film insert is positioned centrally between the opposite plane surfaces of the card and an adhesive substance is confined wholly within the aperture and bonds the peripheral edge of the film to the peripheral edge of the aperture. The main difficulty encountered with this type of card is that it utilizes an insufficient bonding area and the film insert subsequently becomes loose. Other proposals have suggested the use of a card having an unshouldered aperture with the periphery of the aperture provided with notches filled with an adhesive substance which is caused to flow and bond a film insert positioned in the aperture. Here again, it was found that an insufficient bonding area was used and the film insert was not effectively held. Another problem with this technique is the relative lack of cohesive strength of the adhesive. Therefore, even in cases where the adhesive bond to the card and the adhesive bond to the film insert remain intact a rupture sometimes occurs within the bridge of adhesive substance filling one or more of the notches, resulting in a failure to hold the film insert within the card.

It is therefore a principal object of the present invention to provide a novel and improved card of the type described wherein a film insert is secured between the opposite plane surfaces of a card by an adhesive bond of high cohesive strength.

It is a further object of this invention to provide a novel and improved method for producing film record cards of the type set forth above.

In accordance with a preferred embodiment of this invention, the card is provided with a ground recess or trench having a depth of approximately .0015 inch in one surface of the card surrounding the predetermined area of the card that is to be apertured out. A series of elongated unconnected slits are punched out of the bottom of the trench, the slits being narrower in width than the trench and extending around the area of the card to be apertured. A paper matte which has been impregnated and coated with a thermoplastic material is then placed within the trench, covering the slits. Following this, the card is then calendered to compress the ends of the matte against the trench and to force the middle of the matte down in the slits. Then a polymer substance such as a hot melt adhesive, thermoset or thermoplastic is applied to the trench so that it fills the trench and the punched out slits and surrounds the matte to form a molded closed-loop frame having a T-shaped cross-section. The frame is confined between the planes of the opposite surfaces of the card. At this stage the card may be shipped directly to the customer for machine processing and film mounting or the card may be completed with the film inserted prior to shipment. The card at this point is well adapted for machine processing by the customer since there are no protruding elements of any kind and there are no exposed punched out areas which would have to be avoided by the sensing means of card handling machines. In preparation for mounting a film insert, a suitable perforating device is employed to punch out the card stock joining the ends of the elongated slits and also to punch out the predetermined area of card stock which is enclosed by the inner edges of the elongated slits. Due to the configuration of the slits, there remain portions of the molded polymer which extend partially over the card aperture and to which the film insert is bonded through the use of heat and pressure. Application of a heated platen die will melt the polymer and effect a bond which extends over the ground shoulder and the edge portions of the film insert, and also down into the space between the peripheral edge of the card aperture and the peripheral edge of the film to very effectively secure the film insert within the card aperture and between the opposite plane surfaces of the card. Since the resultant card aperture has a depth of approximately .0055 inch, from the bottom of the ground trench to the opposite face of the card, all of the desired types of diazo and silver halide films can be mounted and confined between the opposite plane surfaces of the card.

The use of this invention has the advantage that it greatly decreases the chance of cohesive bond failure within the adhesive which joins a film to a card.

The foregoing and other objects, features and advantages of the invention will be apparent from the following more particular description of a preferred embodiment of the invention, as illustrated in the accompanying drawings.

In the drawings:

FIG. 3 is a fragmentary perspective view of the card of FIG. 2 further provided with a matte frame which has been impregnated and coated with a thermoplastic material.

FIG. 4 is a sectional view taken along the line 4—4 of FIG. 3 showing the coated impregnated matte in place before calendering.

FIG. 5 is a sectional view taken along the line 5—5 of FIG. 3 showing the coated impregnated matte in place after calendering.

Figure 1:
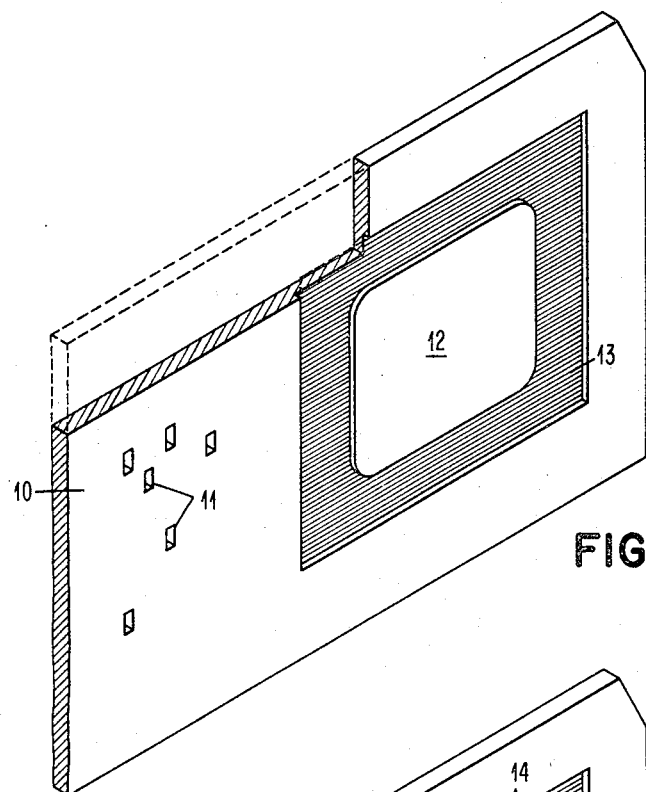
FIG. 1 is a fragmentary perspective view of a record card provided with a ground trench surrounding the area of the card to be apertured.

Referring to FIG. 1, 10 indicates an oblong single ply record card which is formed of cardboard or heavy relatively stiff material having a thickness of approximately .007 inch and which may be of the same shape and size in all dimensions as the cards commonly employed in connection with known statistical, tabulating and record card sorting systems and machines. The card may be punched as indicated at 11 with information or data relating to the film to be ultimately carried or mounted in an aperture in the card. In a predetermined location on the card is a generally rectangular area or core 12 which is to be ultimately apertured out to receive a film insert. The first step in carrying out the present invention is to grind in one face of the card a groove or trench 13 around the area 12. The trench is preferably ground to a depth of from .001 to .0015 inch through the use of a high speed grinding wheel coacting against a backup die provided with a raised pattern having the same configuration as the trench or area to be ground. Grinding mechanisms of this type for grinding cards are known in the art and is shown, for example, in the Langan et al. Patent No. 3,103,756. As illustrated in FIG. 1, the core 12 is left with a surrounding strip of thinner cardstock having a thickness of from .0055 to .006 inch corresponding to the maximum thickness of the film to be mounted.

Figure 2:
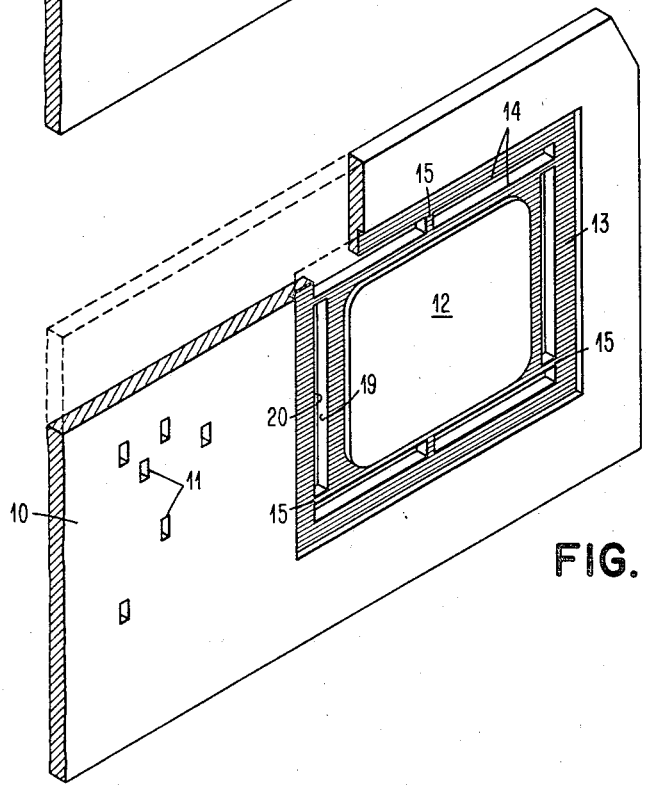
FIG. 2 is a fragmentary perspective view of the card of FIG. 1 further provided with elongated slits around the bottom of the trench.

Referring to FIG. 2, the next step involves the cutting of a series of interrupted elongated slits 14 around the bottom of the trench 13. The slits communicate with the opposite face of the card and preferably have a rectangular configuration which runs parallel to the sides of the core area 12 and the perimeter of the ground trench. The slits may be cut by any suitable punch and die mechanism and the slits should be spaced inwardly from the outside perimeter of the trench such that a recessed ledge or shoulder may be formed to which the film may be bonded in a manner to be described. Bridges of cardstock 15 between the slits maintain the core area intact with the card.

As shown in FIGS. 3, 4 and 5, after cutting of the slits the trench 13 and slits 14 are covered by a matte 22 which has been impregnated and coated with a thermoplastic material 23. The matte is preferably made of paper which has randomly oriented fibers. Such a matte will have substantially equal cohesive strength in all directions. It will of course be recognized that a non-woven matte such as Dacron or other suitable material could also be used. The thermoplastic material which is used to impregnate and coat the matte is of the variety commonly known as "hot melt" adhesives. The thermoplastic used must have the following features: good bonding strength to microfilm (generally acetate or Mylar); good bonding strength to paper; some elasticity to "give" with the changes of temperature and humidity; a good working viscosity at application temperatures; good stability (minimum of deterioration) over a long period of time. A great variety of hot melt adhesives having the above features are well known and commercially available. For example, hot melt adhesives sold by the Pyroxylin Products Company under the names of K101–43–1, K101–43–2, A4299P, and A4403 have been found to have the above features and are suitable for use in this process. The matte may be impregnated and coated with the thermoplastic in any of a variety of well-known manners. For example, a hot melt adhesive may be placed on top of the matte and, after the adhesive has melted, drawn down with an adjustable knife, thus impregnating and coating the matte. As is shown in FIG. 4, the impregnated and coated matte is thicker than the depth of the trench 13 and therefore extends above the shoulders of the trench.

The next step is to calender the card forcing the matte to conform to a T-mold configuration with the ends of the matte compressed against the trench 13 and the middle of the matte extending down into the punched slit 14. The result of the calendering operation is shown in FIG. 5. The following table shows the parameters used during the calendering operation:

| Parameter | Range | Typical |
| --- | --- | --- |
| Temperature, °F | 200–450 | 280 |
| Pressure, p.s.i. | 45–70 | 54 |
| Time, seconds | 0.9–4.0 | 1.8 |

After calendering, the frame formed by the matte and the thermoplastic is confined between the opposite plane surfaces of the card.

The card as shown in FIG. 5 is in condition to be shipped to those users who desire to machine process the cards and mount their own film inserts as part of their information retrieval system. It will be noted that there are no elements protruding from either surface of the card, no cover sheets which might be torn loose and no openings in the card other than data perforations which are to be sensed. The impregnated coated matte, of course, prevents electrical sensing from occurring through the slits 14. As a result, the card lends itself perfectly to machine processing by the user prior to film mounting.

Figure 6:
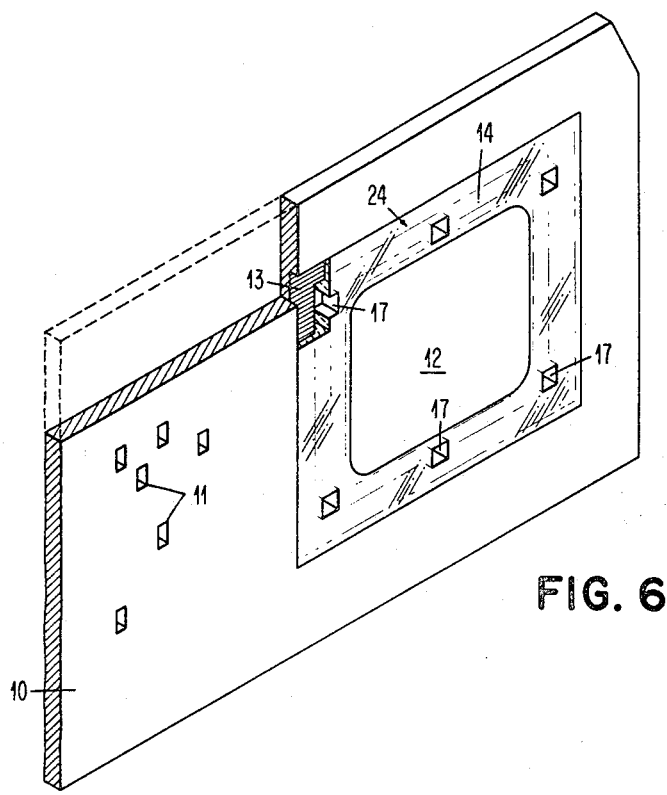
FIG. 6 is a fragmentary perspective view of the card of FIG. 3 with the cardstock separating the elongated slits removed.
Figure 7:
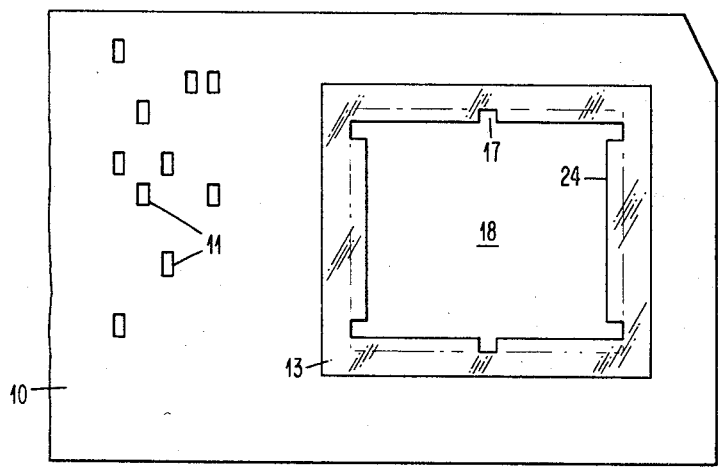
FIG. 7 is a plan view of the card of FIG. 6 with the predetermined area of the card surrounded by the slits removed.
Figure 8:
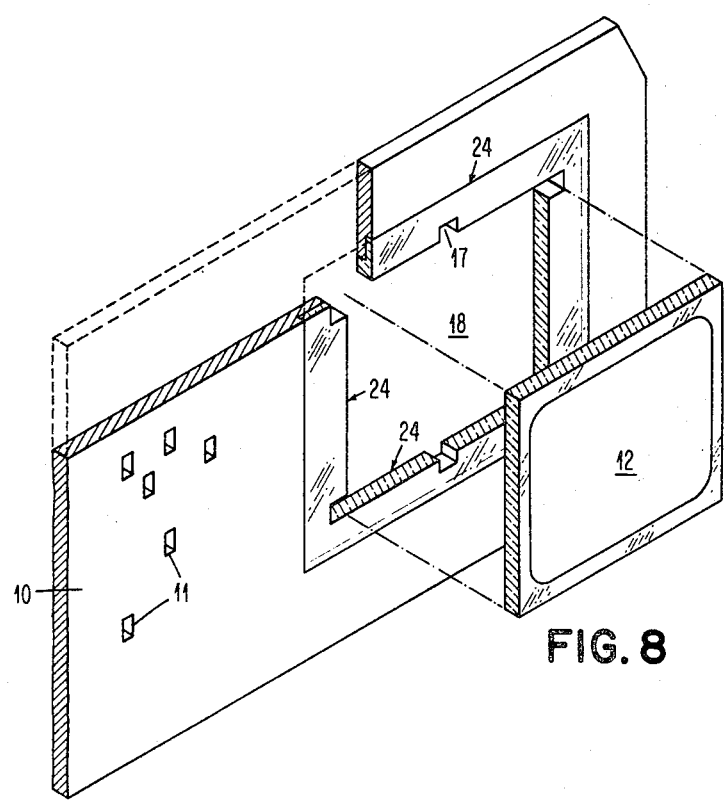
FIG. 8 is a fragmentary perspective view of the card of FIG. 7.
Figure 9:
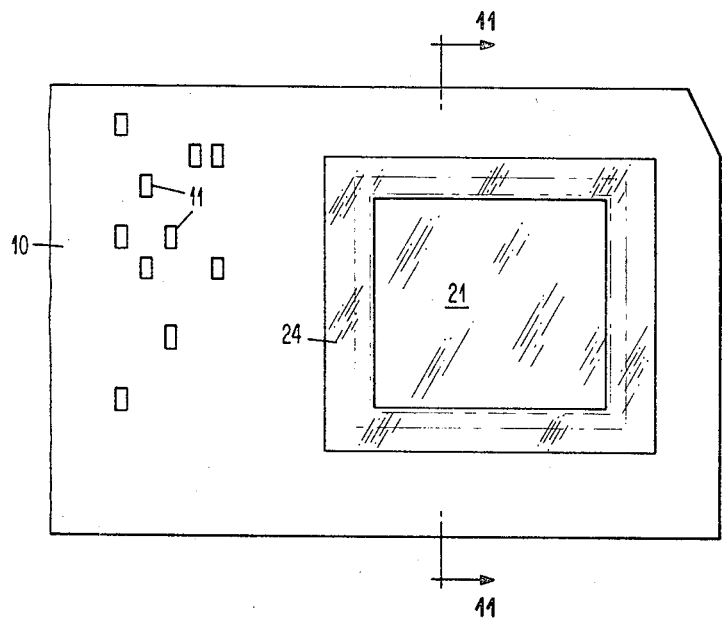
FIG. 9 is a plan view of the card of FIG. 7 with a film insert bonded thereto.

When it is desired to mount a film piece the next step, as illustrated in FIG. 6, is to punch out the cardstock bridges 15 between the slits, thus forming the through holes 17, as shown. At this point, the core area 12 remains intact with the card by virtue of the impregnated matte 24. The punching may be effected by any suitable punch and die structure. After the removal of the bridge portions, the central core area 12 and part of the covered ground trench 13 is punched out to provide the card aperture 18 as shown in FIGS. 7 and 8. A suitable punch and die structure for forming the aperture is shown in the aforementioned U.S. Patent No. 3,103,756 and it will be understood that such a punch structure could be easily modified to punch both the opening 17 and the aperture 18 in one operation if desired. As shown, the dimensions of the punch and die are such that the cut is made through the covered trench along the inner edges 19 (see FIG. 2) of elongated slits 14. As a result of cutting along the inner edges of the slits, it can be seen that the central core area 12 is removed and the cardstock aperture, in effect, takes the dimension defined by the outer edges 20 of the slits 14 with the coated impregnated matte 24 which fills the slits extending into the aperture, as shown in FIG. 7, to form a ledge or shoulder to which a film insert may be inducted.

Figure 10:
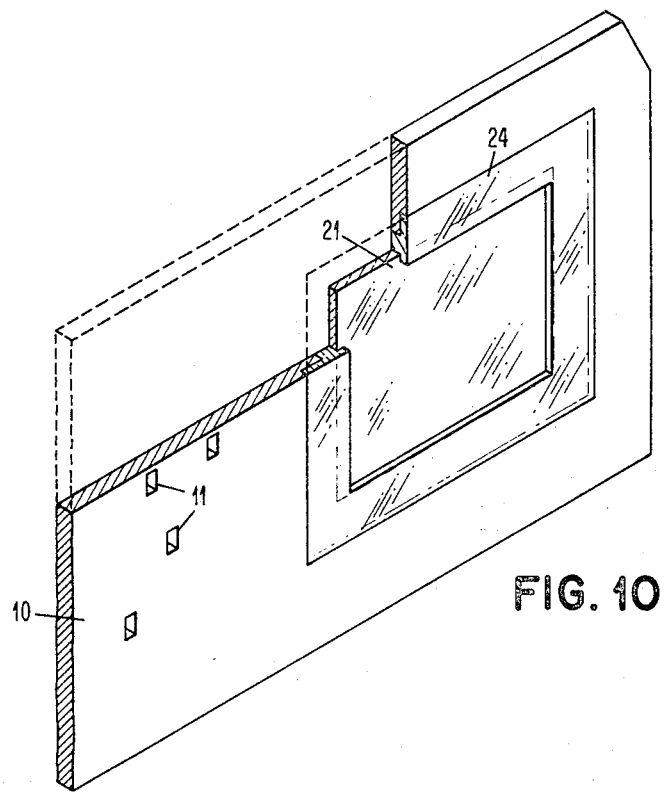
FIG. 10 is a fragmentary perspective view of the card of FIG. 9.
Figure 11:
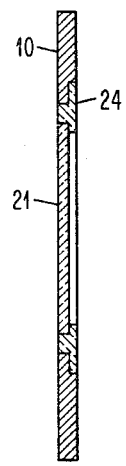
FIG. 11 is a sectional view taken on line 11—11 of FIG. 9.

Having thus formed the aperture, the desired section of film 21 is bonded over the aperture and to the impregnated coated matte by positioning the card on a backup support and using a suitable heated pressure platen similar to the one illustrated in the Langan Patent No. 2,859,550. As shown in FIG. 10, the film insert 21 has the same shape as the aperture but is slightly smaller in size. The emulsion side of the film is positioned against the portions of the impregnated coated matte which extend into the aperture and the thermoplastic material which impregnates and coats the matte then forms a rectangular frame each leg of which has a T-shaped cross-section, said frame bonding the film to the card. For bonding, the temperature may fall in the range from 200 to 400 degrees F. and the pressure may vary from 20 to 600 p.s.i. The resulting bond securely retains the film insert between the opposite plane surfaces of the card and insures that the card may be repetitively processed through machines without coming apart or hindering the machine.

The present method of forming the film record card greatly increases the cohesive strength of the bond between the film and the card. The card thus formed is not only extremely satisfactory for machine processing prior to film mounting but it also lends intself to the use by the customer of a single film mounting device wherein the operations of card aperturing and film bonding may be carried out in simple fashion. Additionally, the present method is adapted to be carried out on high speed rotary equipment where it is desired to have the manufacturer make the completely assembled card prior to shipment. The cardstock bridges 15 may, if desired, be removed prior to shipment to customers. Reactivation of the thermoplastic under heat and pressure will cause lateral flow of hot melt into the voids caused by bridge removal.

While the invention has been particularly shown and described with reference to a preferred embodiment thereof, it will be understood by those skilled in the art that various changes in form and details may be made therein without departing from the spirit and scope of the invention.

What is claimed is:
1. A record card for use in film record card systems comprising:
 a card having a predetermined area which is to be apertured;
 a trench formed in one face of said card and surrounding said predetermined area;
 a series of interrupted elongated slits disposed around the bottom of said trench; and
 a frame comprising a matte which is coated and impregnated with a thermoplastic material, said frame substantially filling said trench and said elongated slits, said frame being bonded to said card and having edge portions to which a film insert may be bonded after aperturing said predetermined area;
 said frame providing a bond of great cohesive strength between said card and a film insert.
2. The record card of claim 1 wherein:
 said matte comprising paper having substantially randomly oriented fibers.
3. A method of making a film record card for use in card record systems comprising the steps of:
 forming a trench in one face of the card surrounding a predetermined area of the card;
 cutting a series of interrupted elongated slits around the bottom of said trench;
 filling said trench and said slits with a frame comprising a matte which has been coated and impregnated with a thermoplastic material;
 removing that portion of the card which is defined by the inner periphery of said series of slits to provide an aperture in said card surrounded by said frame, the edge portions of said frame extending partially into said aperture; and
 positioning a film insert in said aperture and bonding same to the edge portions of said frame.

References Cited
UNITED STATES PATENTS

| | | | |
|---|---|---|---|
| 2,512,106 | 6/1950 | Langan | 40—158 |
| 2,612,711 | 10/1950 | Baker | 40—158 |
| 2,859,550 | 11/1958 | Langan | 40—158 |
| 2,963,809 | 12/1960 | Parker | 40—158 |
| 2,984,921 | 5/1961 | Hezig | 40—158 |

EUGENE R. CAPOZIO, *Primary Examiner.*
W. J. CONTRERAS, *Assistant Examiner.*